United States Patent [19]

Brenner et al.

[11] 3,824,545

[45] July 16, 1974

[54] ARRANGEMENT FOR COLLECTING AND/OR DISTRIBUTING INFORMATION VIA TRANSMISSION LINES

[75] Inventors: Jean Yves René Lucien Brenner, Savigny/Orge; Didier Jean Mougel, Arcueil; Alain Jacques Himmelbauer, Hay-Les-Roses, all of France

[73] Assignee: U.S. Phillips Corporation, New York, N.Y.

[22] Filed: Nov. 6, 1972

[21] Appl. No.: 303,979

[30] Foreign Application Priority Data

Nov. 5, 1971 France .............................. 71.39787

[52] U.S. Cl. .......... 340/151, 340/147 R, 340/167 R

[51] Int. Cl. .............................................. H04q 9/14

[58] Field of Search ............. 340/151, 167 R, 147 R

[56] References Cited

UNITED STATES PATENTS 3,214,733 10/1965 Spencer .......................... 340/151 X 3,510,841 5/1970 Lejon .............................. 340/151 R 3,601,806 8/1971 Heimbigner ..................... 340/151 R

*Primary Examiner*—Harold I. Pitts

*Attorney, Agent, or Firm*—Frank R. Trifari; Simon L. Cohen

[57] ABSTRACT

An arrangement for collecting and/or distributing information, comprising a master station and a number of terminal stations, each terminal station being connected to the preceding terminal station via a transmission line, the first terminal station being connected to the master station. All terminal stations are connected to the master station via a number of collecting lines. By transmission of a pulse on the transmission line, the information which is transmitted by the terminal stations to the master station or vice versa is successively received on the collecting lines.

3 Claims, 5 Drawing Figures

ARRANGEMENT FOR COLLECTING AND/OR DISTRIBUTING INFORMATION VIA TRANSMISSION LINES

BACKGROUND OF THE INVENTION

The present invention relates to an arrangement for collecting and/or distributing information which is exchanged between a master station and $n$ terminal stations via $m$ collecting lines.

There are two transfer modes which are most often used for collecting and/or distributing information:

- the mode in which the information is transferred in parallel, i.e., the coded information is transferred via a number of lines which is equal to the number of bits of the characters in the code used, all bits of the same character being simultaneously transferred.
- the mode in which the information is transferred in series, i.e., the coded information is sequentially transferred via one line.

If one of of these transfer modes is used to exchange information between a master station and terminal stations by consecutively interrogating all terminal stations, each interrogation of a terminal station or each transfer of information from a terminal station must be preceded by the address of said terminal station.

Consequently, in the first case not only address encoding and decoding circuits are required, but also a large number of transmission lines, while in the second case complex electronic circuits are required.

In the arrangement according to the invention these drawbacks are eliminated in that the arrangement comprises a minimum number of transmission lines and also a minimum number of electronic circuits; this is possible in that use is made of a ordered mutually time-shift of the informations which enter or leave the terminal stations, the terminal stations being connected in series so that each terminal station is actuated after the preceding terminal station and before the subsequent terminal station. To this end, each terminal station is provided with a delay unit which is actuated by the trailing edge of the pulse supplied by the preceding terminal station and which in turn supplies a pulse. The exchange of information between said terminal station and the master station is effected during the time interval which corresponds to the pulse supplied by the terminal station.

The arrangement according to the invention for collecting and/or distributing information which is exchanged between a master station and $n$ terminal stations via $m$ collecting lines is characterized in that each terminal station is connected to the preceding terminal station via a transmission line, the first terminal station being connected to the master station via a transmission line, each terminal station comprising a delay unit which delays a pulse which is originally transferred from the master station to the first terminal station and which is consecutively transmitted to all terminal stations via the transmission line by a given time interval.

SUMMARY OF THE INVENTION

A preferred embodiment of the arrangement according to the invention is characterized in that the delay unit comprises a first and a second monostable circuit. The first monostable circuit determines the beginning of the pulse which is applied to the subsequent terminal station, while the end of said pulse is determined by the second monostable circuit.

Another embodiment of the arrangement according to the invention is characterized in that a terminal station comprises a distribution circuit which is connected to the output of the delay unit and which distributes the delayed pulse to one or more of $m$ collecting lines.

BRIEF DESCRIPTION OF THE DRAWINGS

The invention will be described in detail with reference to the figures which are given in the drawings.

Therein.

DESCRIPTION OF THE PREFFERRED EMBODIMENT

Figure 1:
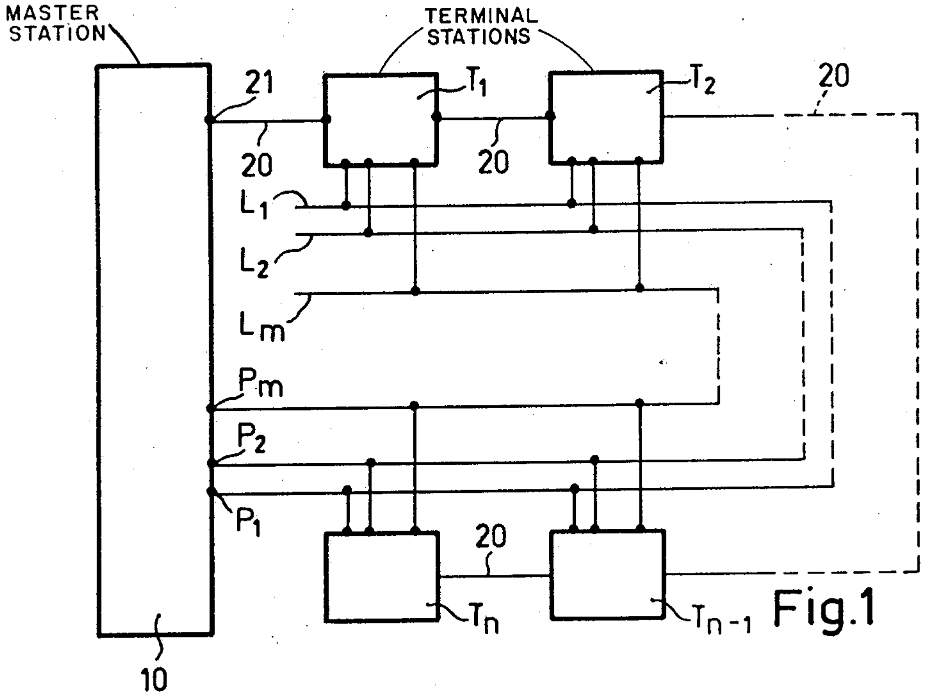
FIG. 1 shows a block diagram of a system comprising terminal stations and a master station for practicing the present invention.

The master station 10 in FIG. 1 is connected to $n$ terminal stations $T_1, T_2, \ldots T_{n-1}, T_n$ via the transmission line 20, the terminal station $T_1$ being connected to the master station at point 21. The arrangement comprises $m$ collecting lines $L_1, L_2, \ldots, L_m$ which are connected on the one side to the terminal stations $T_1, T_2, \ldots, T_n$ and on the other side to the master station at the points $P_1, P_2, \ldots, P_m$. The operation of the arrangement is as follows. The master station 10 transmits a pulse at point 21 via the transmission line 20. The terminal station $T_1$ delays this pulse by a given time interval and subsequently transmits this pulse to the subsequent terminal station $T_2$. As long as the pulse is being transmitted by the terminal station $T_1$, information can be exchanged between the master station 10 and the terminal station $T_1$ via the collecting lines $L_1, L_2, \ldots, L_m$. The terminal station $T_2$ also delays the pulse it receives by a given time interval before transmitting this pulse to the subsequent terminal station etc. until the terminal station $T_n$ is reached. The exchange of information between the master station and each terminal station is thus performed in a given time interval, each terminal station being actuated before the subsequent terminal station and after the preceding terminal station.

Figure 2:
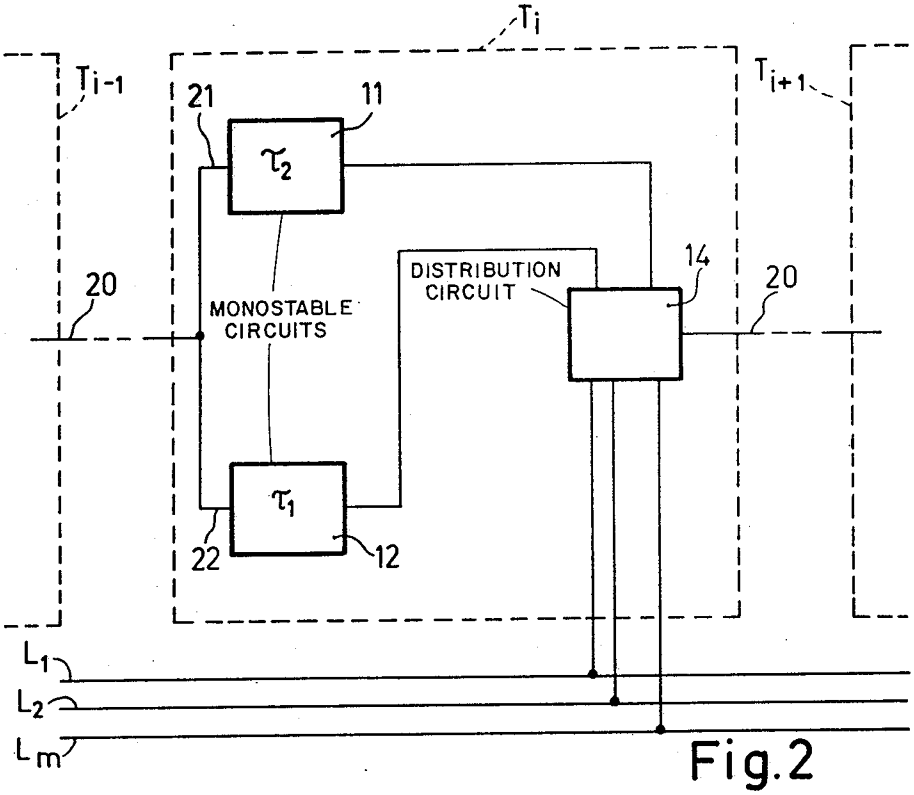
FIG. 2 shows a block diagram of a terminal station.

FIG. 2 shows only one terminal station $T_i$ ($i = 1,2, \ldots, n$) and the connections to the terminal stations $T_{i-1}$ and $T_{i+1}$ via the transmission line 20. Inside the terminal station $T_i$ the line 20 is divided in two parts 21 and 22 respectively. The first part 21 is connected to the monostable circuit 11 which is connected to the distribution circuit 14. The second part 22 is connected to the monostable circuit 12 which is also connected to the distribution circuit 14. The circuit 14 is connected to the collecting lines $L_1, L_2, \ldots, L_m$ and to the transmission line 20. When the pulse reaches the terminal station $T_{i-1}$ via the line 20, this pulse actuates the monostable circuit 11, having a period $\tau_2$, and the monostable circuit 12 which has a period $\tau_1$ ($\tau_2 > \tau_1$). The end of the pulse of the monostable circuit 12 determines the beginning of a pulse which is applied to the various lines by the circuit 14, the end of the pulse of the monostable circuit 11 determining the end of said pulse which therefore has a duration which is equal to $\tau_2 - \tau_1$. Consequently, an appropriate choice of the components of the monostable circuits 11 and 12 is sufficient to obtain a delayed pulse having a width which is equal to the width of the previous pulse. In any case, this width is of little importance if one of the lines $L_1, L_2, \ldots, L_m$ is used for synchronization in the direction of the master station, which means that all pulses transmitted by the terminal stations are transmitted to the master station via one synchronization line.

Figure 3:
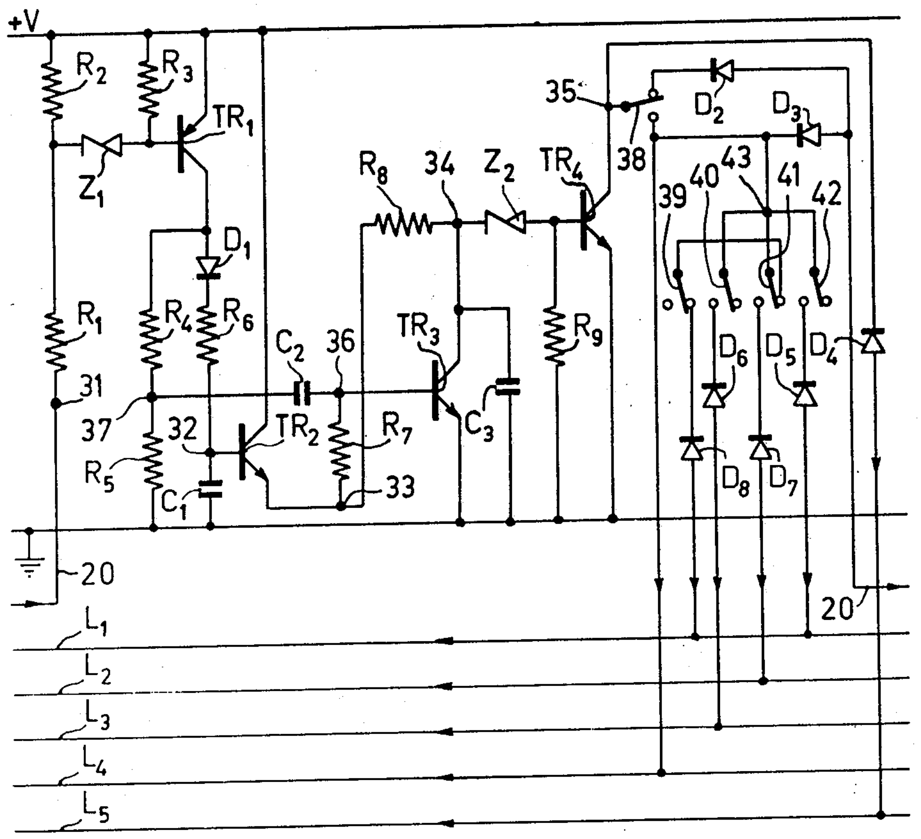
FIG. 3 shows a diagram of an embodiment of a terminal station.

FIG. 3 shows the diagram of an embodiment of the terminal station in which the line 20 is connected to the resistor $R_1$ at point 31. The resistor $R_1$ is connected to the resistor $R_2$ and the Zener diode $Z_1$. The emitter of the transistor $TR_1$ is connected to the potential +V. The base of said transistor is connected to the resistor $R_3$ and the other end of the Zener diode $Z_1$. The collector of the transistor $TR_1$ is connected in series, via diode $D_1$ and resistor $R_6$, to the base of the transistor $TR_2$ and the capacitor $C_1$ (at point 32), and is furthermore connected to the series connection of the resistors $R_4$ and $R_5$. The collector of the transistor $TR_2$ is connected to the potential +V. The emitter of transistor $TR_2$ is connected to the junction 33 of the resistors $R_8$ and $R_7$. The other end 36 of resistor $R_7$ is connected to the base of transistor $TR_3$ and to the capacitor $C_2$ which is connected to the resistors $R_4$ and $R_5$ at point 37. The emitter of the transistor $TR_3$ is connected to ground and the collector is connected at point 34 to the capacitor $C_3$, the resistor $R_8$ and the Zener diode $Z_2$. The diode $Z_2$ is connected to the resistor $R_9$ and the base of the transistor $TR_4$. The emitter of the transistor $TR_4$ is connected to ground, the collector of this transistor being connected at point 35 to the diode $D_4$ which is connected to the synchronization line $L_5$, and to the two-position switch 38 which either feeds the collector signal via the diode $D_2$ and the line 20 to the subsequent terminal station, or to the line $L_4$, the diode $D_3$ and the point 43. From the point 43 the signal proceeds to the two-position switches 39, 40, 41, 42 which are connected to the lines $L_1$, $L_3$, $L_2$ and $L_1$ via the diodes $D_5$, $D_6$, $D_7$ and $D_8$, respectively. From the diode $D_3$ the signal proceeds to line 20 and the subsequent terminal station.

Figure 4:
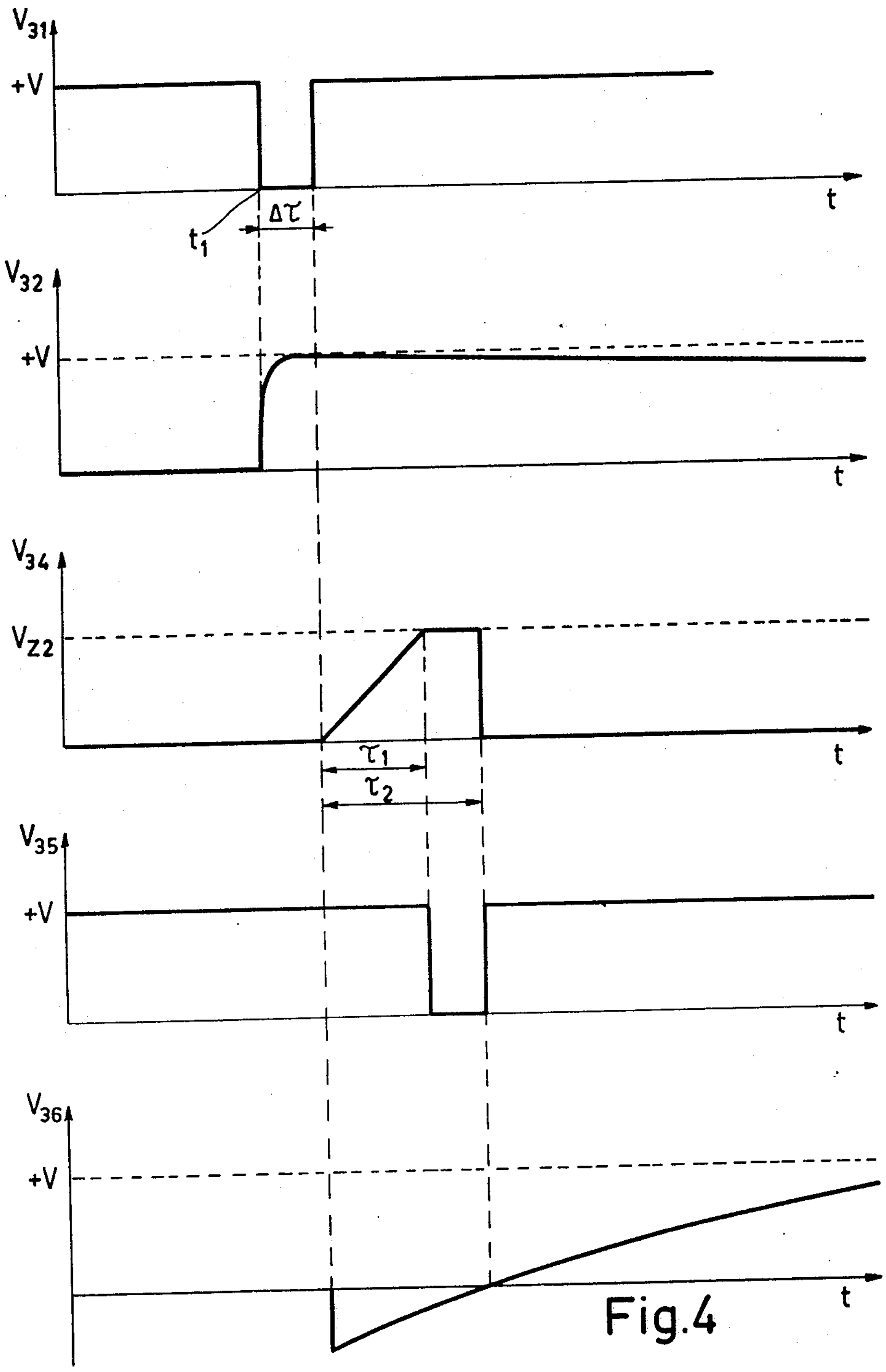
FIG. 4 shows time diagrams of voltages which appear at a number of points of a terminal station.

The operation of this terminal station will now be described in detail with reference to FIG. 4. This figure shows the voltages $V_{31}$, $V_{32}$, $V_{34}$, $V_{35}$, $V_{36}$ and $V_{37}$ which appear at the points 31, 32, 34, 35, 36 and 37, respectively, in FIG. 3, $\Delta\tau$ being the width of the pulse which is transmitted by the preceding terminal station and which starts at the instant $t_1$, $\tau_1$ and $\tau_2$ being the periods of the first and the second monostable circuit which were described with reference to FIG. 2 and whose period duration is determined by the capacitor $C_3$ and the capacitor $C_2$, respectively, shown in FIG. 3.

At the instant $t_1$ the terminal station receives a pulse at the point 31 of line 20 which has a width $\Delta\tau$ and an amplitude −V (in the rest state the line has a voltage +V, in the operating state this voltage amounts to zero). At the instant $t_1$ the transistor $TR_1$ which was initially cut off becomes conducting and the capacitor $C_1$ is quickly charged via the resistor $R_6$ ($V_{32}$ in FIG. 4), while at the point 37 a voltage ($V_{37}$ in FIG. 4) prevails which is substantially equal to:

$$V\cdot(R_5/R_4+R_5)$$

The pulse terminates at the instant $t_1 + \Delta\tau$ and the voltage at point 31 becomes equal to +V again. The voltage at point 32 ramains substantially constant during the entire time interval under consideration, the capacitor $C_1$ being discharged with a very large time constant. The transistor $TR_1$ is cut off, but the transistor $TR_2$ remains saturated with the result that the capacitor $C_3$ is linearly charged via $R_8$ to the Zener voltage $V_{z2}$ of the Zener diode $Z_2$ during a time interval $\tau_1$ ($V_{34}$ in FIG. 4).

At the instant $t_1 + \Delta\tau + \tau_1$ the voltage of the collector of the transistor $TR_4$ ($V_{35}$ in FIG. 4) becomes zero because the transistor is saturated. On the other hand, at the instant $t_1 + \Delta\tau$ the voltage at the point 36 ($V_{36}$ in FIG. 4) on the base of the transistor $TR_3$ suddenly becomes equal to $-V\cdot(R_5/R_4+R_5)$ because the transistor $TR_1$ becomes cut off and the voltage of the point 37 becomes substantially equal to zero.

However, because the transistor $TR_2$ is conducting, the capacitor $C_2$ is charged via the resistor $R_7$. When the voltage at the point 36 becomes zero, the transisotr $TR_3$ is saturated with the result that the voltage of point 34 suddenly decreases to zero so that the transistor $TR_4$ is cut off, the collector voltage of said transistor, at the point 35, increasing to the value +V again. By considering the voltage variations at the point 35 it can thus be seen from FIG. 4 that at the instant $t_1 + \Delta\tau + \tau_1$ a negative pulse having an amplitude V and a width $\tau_2 - \tau_1$ is transmitted to the line 20, which means that the original pulse has been delayed by a time interval $\Delta\tau + \tau_1$.

The embodiment of the terminal station shown in FIG. 3 comprises switches by means of which the following functions can be realized:

by means of the switch 38 the operator of the terminal station can announce his presence (in FIG. 4 the switch 38 is shown in the position "absent") by transmitting the delayed pulse also via line $L_4$. By means of the four switches 39, 40, 41, 42 three possible answers, YES, NO and NO OPINION, can be given to a question which is asked by the operator of the master station. By means of the switch 40 the answer NO can be given, while the answer YES can be given by means of the switch 41 and the answer NO OPINION by means of the switch 42. If the operator of the terminal station is present while he does not wish to vote, the answer NO OPINION is automatically transmitted via the switch 39 which is coupled to the switches 40, 41 and 42. Finally, the diode $D_4$ transmits the pulse from the point 35 to the line $L_5$ which is synchronization line, which means that all delayed pulses are transmitted to this line with the result that the terminal stations can be counted and the interrogation can be stopped after a predetermined number of terminal stations has been counted.

Figure 5:
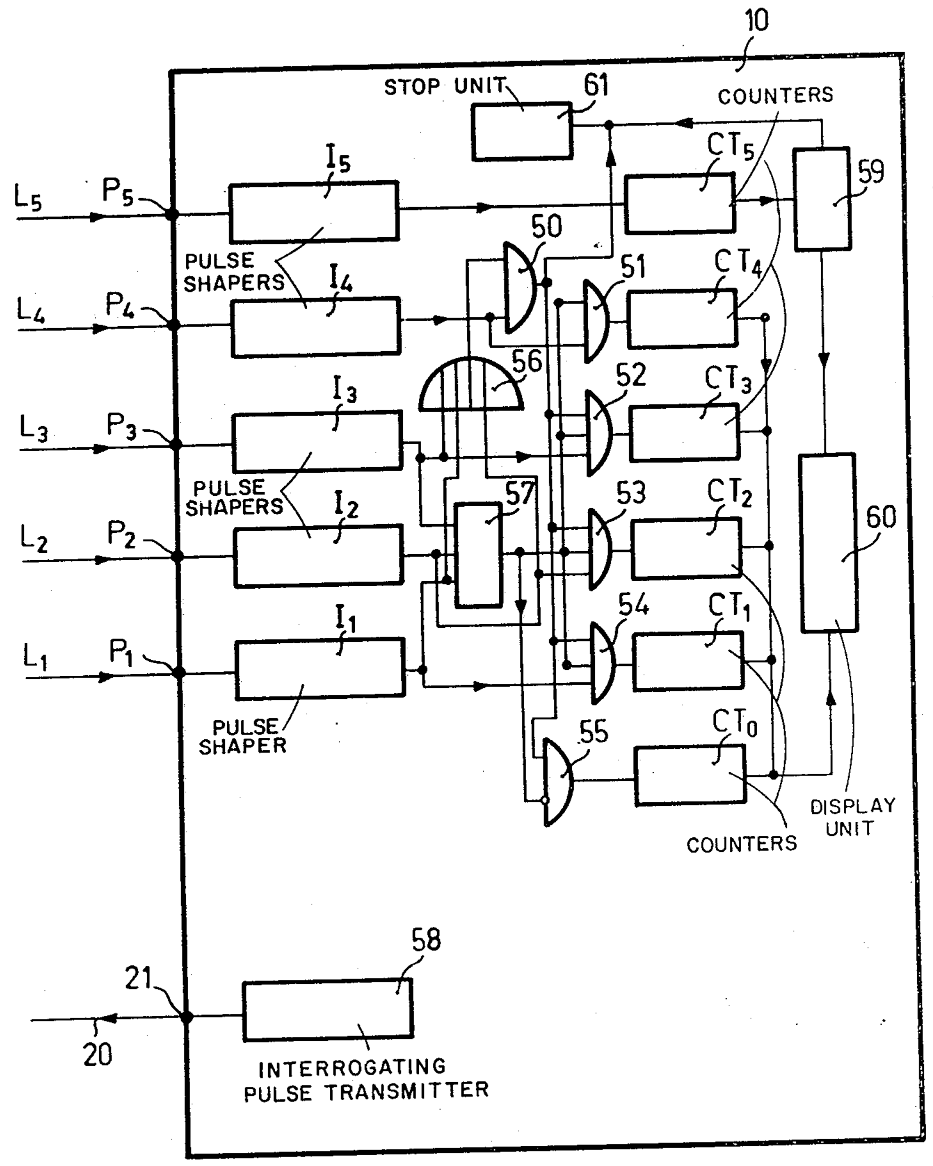
FIG. 5 shows a block diagram of the master station.

FIG. 5 shows the block diagram of the master station 10. The transmission lines $L_1$, $L_2$, $L_3$, $L_4$ and $L_5$ are connected to the said master station 10 at the points $P_1$, $P_2$, $P_3$, $P_4$ and $P_5$, respectively, and are connected in the master station to the pulse shapers $I_1$, $I_2$, $I_3$, $I_4$ and $I_5$. The pulse shaper $I_5$ is connected to the counter $CT_5$ which counts the synchronization pulses originating from the synchronization line $L_5$. The counter $CT_5$ is connected to the comparison unit 59 which is connected to a display unit 60. The pulse-shaper $I_4$ is connected to the AND-gates 50 and 51. The output of AND-gate 51 is connected to the counter $CT_4$. The output of AND-gate 50 is connected to the stop unit 61, by means of which the master station can be switched off. The pulseshaper $I_3$ is connected to the ORgate 56, the logic gate 57 and the AND-gate 52, the output of the latter gate being connected to the counter $CT_3$. The pulseshaper $I_2$ is connected to the OR-gate 56, the logic gate 57 and the AND-gate 53, the output of the latter gate being connected to the counter $CT_2$. The pulse-shaper $I_1$ is connected to the OR-gate 56, the logic gate 57 and the AND-gate 54, the output of the latter gate being connected to the counter $CT_1$. The output of the logic gate 57 is connected to the AND-gate 51, the AND-gate 52, the AND-gate 53 and the AND-gate 54 and to an inverting input of the AND-gate 55, the output of the latter gate being connected to the counter $CT_0$. The output of the OR-gate 56 is connected to the AND-gate 50, the output of the latter gate being connected to the AND-gates 52, 53, 54 and 55. The unit 58 can transmit a pulse on line 20 to the first terminal station so as to commence the interrogation process of the terminal stations. The results of the process are added by the abovementioned counters of the master station which have access to the display unit 60 in order to display the results.

The operation of the master station will be descried in detail hereinafter.

If a participant of the system wishes to give the answer YES, he operates the switch 41 with the result that, when the pulse arrives at the terminal station, a pulse is applied to the line $L_2$. Regardless of the answer, a pulse is also applied to the line $L_5$ and to the line $L_4$; in the latter case it is assumed that the participant operated the switch 38 when he entered the terminal station.

The pulse of the line $L_4$ is applied to the AND-gate 50. The pulse of the line $L_2$ is applied once via the logic gate 57 to the AND-gate 53, once directly and once via the OR-gate 56 and the AND-gate 50, the latter gate being prepared by the pulse from line $L_4$ in order to allow passage of the output pulse of OR-gate 56. Each of the inputs of the AND-gate 53 then receives a pulse simultaneously, with the result that this gate supplies a pulse to the counter $CT_2$. This pulse increases the counting position by one. In this manner the number of answers YES is totalled by counter $CT_2$.

The case where the participant wishes to give the answer NO is completely analogous to the preceding case. In this case the participant operates the switch 40 so that a pulse is applied to the line $L_3$. This pulse and the pulse which is applied to line $L_4$, cause the counting position of the counter $CT_3$ in the master station 2 to be increased by one. This counter thus totals the number of answers No.

The case where the participant wishes to give the answer NO OPINION is analogous to the two preceding cases. In this case the participant operates the switch 42 with the result that a pulse is applied to the line $L_1$. This pulse and the pulse which is applied to line $L_4$ cause the counting position of the counter $CT_1$ in the master station 10 to be increased by one. This counter thus totals the number of answers NO OPINION.

If a participant does not give an answer, i.e., he does not operate any of the switches 40, 41 and 42, a pulse is applied to the line $L_1$ via switch 41 and switch 39. This "answer" is then added to the number of answers NO OPINION. This facility can be switched off by setting the switch 39 to its other position which is not shown.

The pulse of line $L_5$ are counted by the counter $CT_5$. The position of this counter thus indicates at any instant the number of stations passed by the interrogation pulse.

The logic gate 57 has a logic function such that it supplies a pulse only if a pulse is received on only one input and not on more than one input. This constitutes a protection against unvalid answers which can be given by a participant by simultaneous operation of two or more of the switches 40, 41 and 42. The result thereof would be that the master station receives a pulse simultaneously from two or more of the lines $L_1$, $L_2$ and $L_3$. In this case logic gate 57 does not suply an output pulse. As a result, the AND-gate 55 is not blocked during the output pulse of AND-gate 50 so that this pulse increases the position of counter $CT_0$ by one. This counter thus totals the number of unvalid answers. The total number of valid answers is totalled by the counter $CT_4$, the position of which is increased by one for each valid answer by the cooperation of the pulse of lie $L_4$ and the output pulse of logic-state 57 in the AND-gate 51.

The master station comprises a unit 61 for fixing the counter positions at the instant at which a defect occurs or at the instant at which counter $CT_5$ reaches a predetermined position. Defects can cause a variety of errors, some of which can be readily detected. For example, the appearance of a pulse on line $L_4$ must always be accompanied by the appearance of a pulse on one of the lines $L_1$, $L_2$ and $L_3$. If this condition is not satisfied, the system does not function properly. This condition is checked by AND-gate 50. If AND-gate 50 does not supply a pulse at the instant at which a pulse is received from line $L_5$, the unit 61 is actuated and it can be deduced from the fixed position of counter $CT_5$ at which terminal station the error occurred.

In comprison unit 59 a given counting position corresponding to the number of terminal stations can be adjusted. This counting position is continuously compared with the position of counter $CT_5$. At the instant at which the position of counter $CT_5$ becomes equal to the preset position, comparison unit 59 actuates the unit 61 and the display unit 60, so that the latter displays the fixed positions of the counters $CT_0$ to $CT_4$. Because each terminal station applies a pulse to the master station via line $L_5$, independent of the presence of a participant and independent of the answer, the system will be stopped after the interrogation pulse has passed all stations so that each station has had the chance of returning an answer.

A system comprising a master station and agiven number of terminal stations as described can be applied in many fields, for example, as a voting machine, and in general in all cases where it is necessary to connect different points of a system (terminal stations) to one and the same point (master station).

The described embodiment relates to an arrangement for collecting information which is transmitted to a master station by terminal stations.

It is obvious that within the scope of the invention the same arrangement can be used to distribute addressed information from the master station to the terminal stations.

What is claimed is:

1. A system for distributing information, comprising a master station, output terminal means on the master station for providing an interrogating pulse, a plurality of information signal input terminals on the master station for receiving information pulses, n terminal stations, an interrogating pulse input terminal on each terminal station, an interrogating pulse output terminal on each terminal station, delay means in each terminal station connected to the interrogating pulse input and interrogating pulse output terminals thereof for providing a delayed interrogating pulse on the interrogating pulse output terminal in response to an interrogating pulse on the input terminal thereof, a plurality of information signal control terminals on each terminal station corresponding to the information signal input terminals of the master station, means for connecting the output terminal of the master station to the interrogating pulse input terminal of a first of the terminal stations, means connecting the interrogating pulse output terminal of the first terminal station to the interrogating pulse input terminal of a second of the terminal stations, means for connecting the interrogating pulse output of each but the last of the n terminal stations to the interrogating pulse input terminal of a subsequent terminal station, whereby the terminal stations are serially interconnected with the master station and each sequentially receive a delayed interrogating pulse in response to the interrogating pulse provided by the master station, manually controllable distribution means in each terminal station for coupling the delayed interrogating pulse selectively to each of the information signal output terminals thereof, and means connecting corresponding information signal output terminals of the terminal stations in parallel to the corresponding information signal input terminals of the master station.

2. A system as claimed in claim 1, wherein the manually controllable distribution means in each terminal station comprises a plurality of switches for selectively supplying the delayed interrogating pulse in the terminal station to the information signal output terminals of the terminal station, and wherein the master station further comprises means connected to each of the information signal input terminals for receiving pulses therefrom and means for counting the pulses from each of the information signal input terminals.

3. An arrangement as claimed in claim 1, wherein the delay means comprises a first and a second monostable circuit, the first monostable circuit determining the beginning of the pulse which is applied to the subsequent terminal station, the end of said pulse being determined by the second monostable circuit.

* * * * *

PO-1050
(5/69)

UNITED STATES PATENT OFFICE
CERTIFICATE OF CORRECTION

Patent No. 3,824,545 Dated July 16, 1974

Inventor(s) JEAN YVES RENE LUCIEN BRONNER, DIDIER JEAN MOUGEL and ALAIN JACQUES HIMMELBAUER It is certified that error appears in the above-identified patent and that said Letters Patent are hereby corrected as shown below:

ON THE TITLE PAGE

Section [75] Inventors: "Brenner" should read --Bronner--;

IN THE SPECIFICATION

Col. 4, line 19, "of" should be --at--;

line 23, "transisotr" should be --transistor--;

line 53, after "is" insert --a--;

Col. 5, line 6, "ORgate" should be --OR-gate--;

line 28, "descried" should be --described--;

Col. 6, line 5, "pulse" should be --pulses--;

line 25, "lie" should be --line--;

"state" should be --gate--;

line 55, "agiven" should be --a given--;

Signed and sealed this 17th day of December 1974.

(SEAL)
Attest:

McCOY M. GIBSON JR.
Attesting Officer

C. MARSHALL DANN
Commissioner of Patents